United States Patent
Hedgecock

(10) Patent No.: US 11,148,108 B2
(45) Date of Patent: Oct. 19, 2021

(54) PAINT MULTI-TOOL ASSEMBLY

(71) Applicant: Aaron Hedgecock, Janesville, WI (US)

(72) Inventor: Aaron Hedgecock, Janesville, WI (US)

(*) Notice: Subject to any disclaimer, the term of this patent is extended or adjusted under 35 U.S.C. 154(b) by 302 days.

(21) Appl. No.: 16/520,513

(22) Filed: Jul. 24, 2019

(65) Prior Publication Data

US 2021/0023516 A1 Jan. 28, 2021

(51) Int. Cl.
| | | |
|---|---|---|
| B01F 7/16 | (2006.01) | |
| B01F 7/18 | (2006.01) | |
| B44D 3/08 | (2006.01) | |
| B05C 17/02 | (2006.01) | |
| B44D 3/00 | (2006.01) | |
| B23B 45/00 | (2006.01) | |

(52) U.S. Cl.
CPC ............. *B01F 7/1695* (2013.01); *B01F 7/18* (2013.01); *B05C 17/0245* (2013.01); *B44D 3/006* (2013.01); *B44D 3/08* (2013.01); *B01F 2215/005* (2013.01); *B23B 45/003* (2013.01)

(58) Field of Classification Search
CPC .................................................. B01F 7/1695
USPC ............................................... 366/129, 605
See application file for complete search history.

(56) References Cited

U.S. PATENT DOCUMENTS

| | | | |
|---|---|---|---|
| 2,163,758 A | | 6/1939 | Mariner |
| 2,542,491 A | * | 2/1951 | Engel ..................... B44D 3/006 69/19 |
| 3,733,645 A | * | 5/1973 | Seiler ................ B01F 15/00538 15/257.01 |
| 4,332,067 A | * | 6/1982 | Pearce ................... B44D 3/006 15/230.11 |
| 4,350,445 A | | 9/1982 | Olsson |
| 4,580,302 A | | 4/1986 | Barth |
| 4,631,769 A | | 12/1986 | White |
| 4,896,390 A | | 1/1990 | Durant |
| D328,230 S | | 7/1992 | Jeffrey |
| 6,520,672 B1 | * | 2/2003 | Whitney ................. A46B 17/06 134/149 |
| 6,902,315 B2 | * | 6/2005 | Hutchinson ............. B01F 7/001 366/129 |
| 2002/0024885 A1 | * | 2/2002 | King ................ B01F 15/00538 366/129 |

* cited by examiner

*Primary Examiner* — David L Sorkin

(57) ABSTRACT

A paint multi-tool assembly includes a shaft that has a hooked end that is insertable into a power tool thereby facilitating the shaft to be rotated when the power tool is turned on. A first cylinder insertably receives the shaft thereby facilitating the first cylinder to be inserted into an open end of a paint roller. Thus, the power tool can rotate the paint roller for cleaning paint off of the paint roller. A plurality of fins is each coupled to and extends away from the first cylinder for stirring paint in the paint container. A second cylinder is coupled to each of the fins such that the second cylinder is spaced from the first cylinder. In this way the second cylinder can be inserted into the paint container or be inserted into the open end of the paint roller.

11 Claims, 3 Drawing Sheets

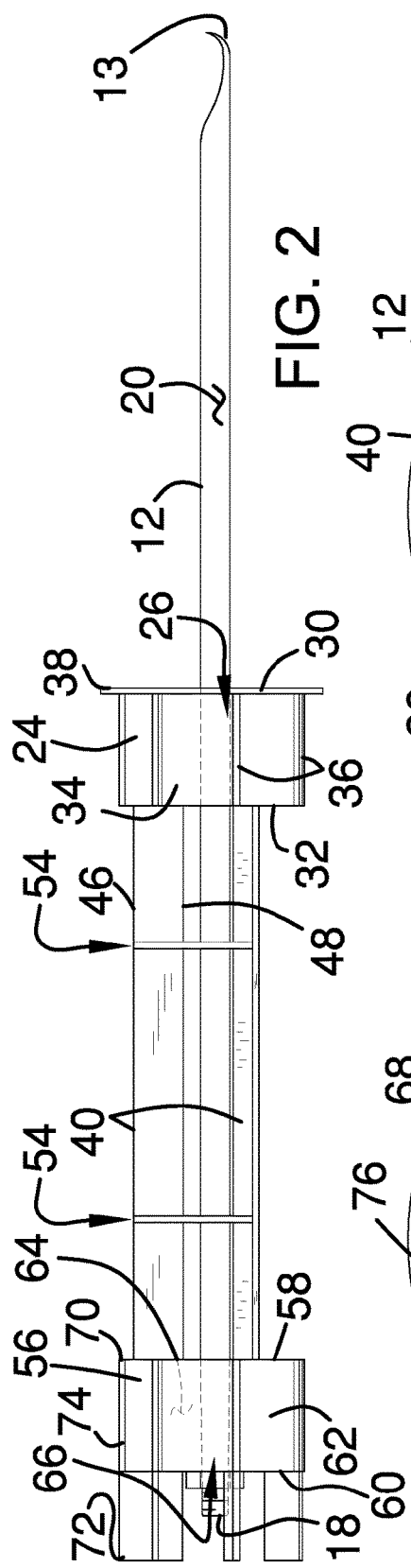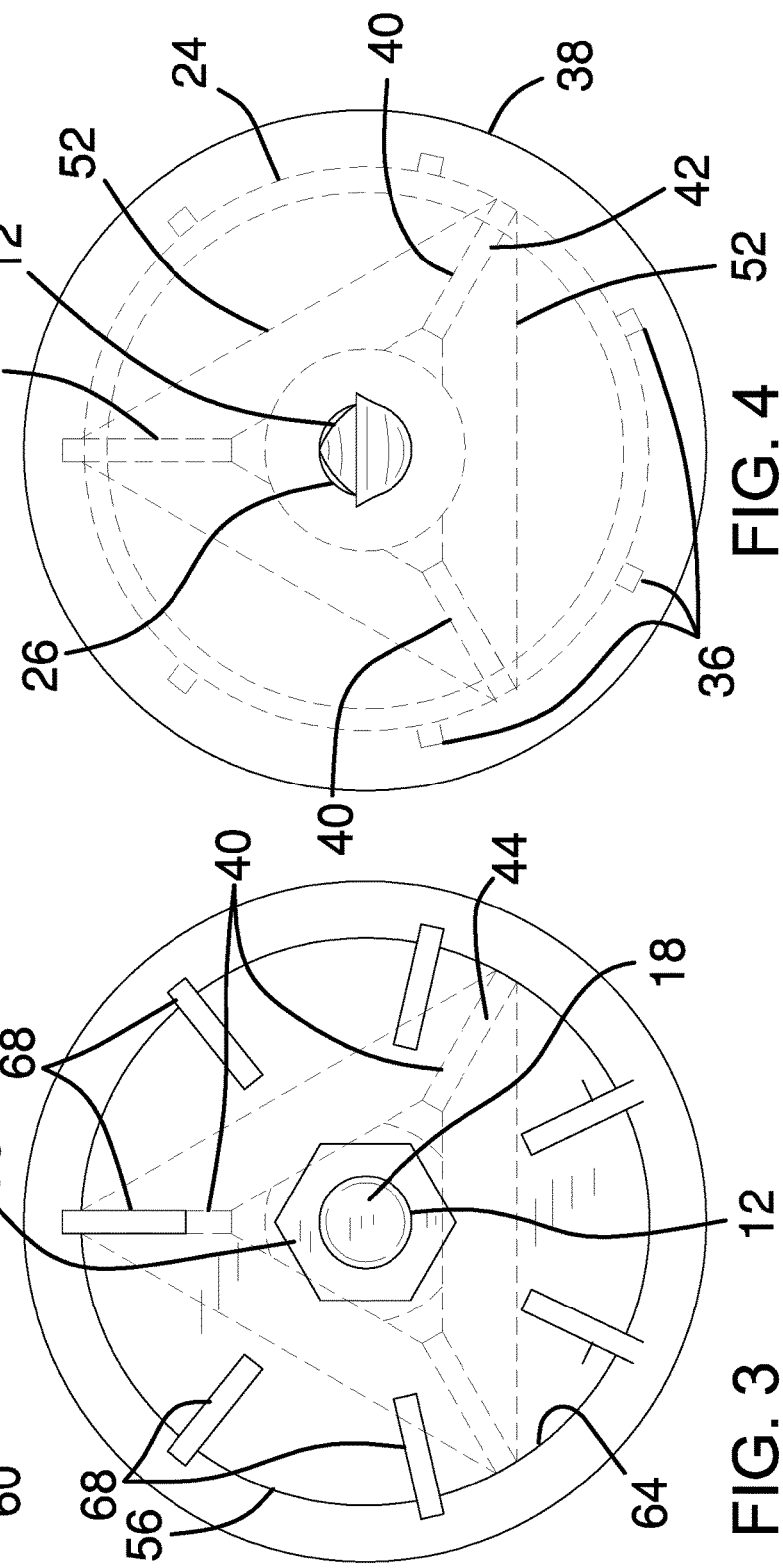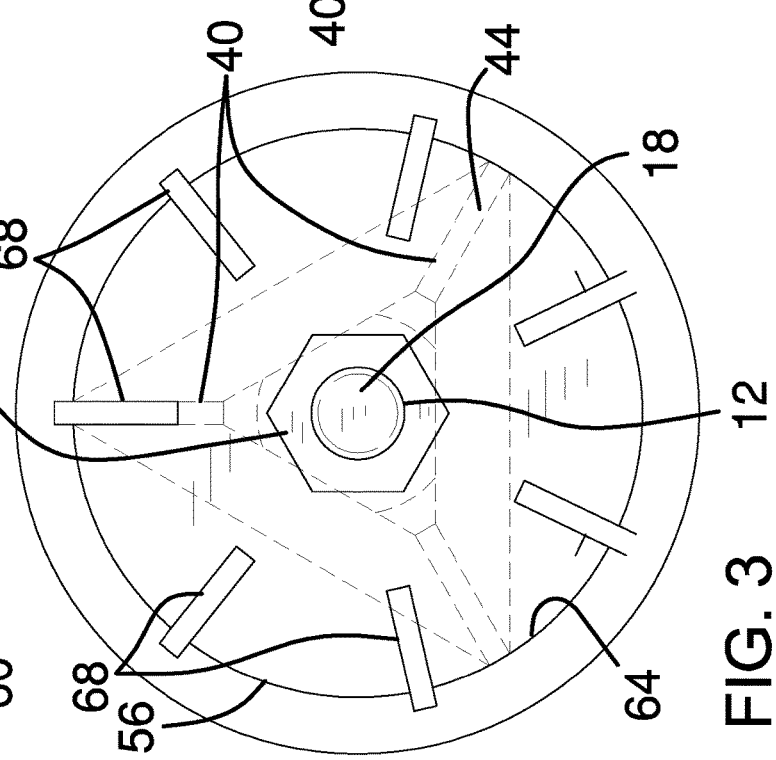

PAINT MULTI-TOOL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to multi-tool devices and more particularly pertains to a new multi-tool device for stirring paint and for cleaning paint rollers.

BRIEF SUMMARY OF THE INVENTION

An embodiment of the disclosure meets the needs presented above by generally comprising a shaft that has a hooked end that is insertable into a power tool thereby facilitating the shaft to be rotated when the power tool is turned on. A first cylinder insertably receives the shaft thereby facilitating the first cylinder to be inserted into an open end of a paint roller. Thus, the power tool can rotate the paint roller for cleaning paint off of the paint roller. A plurality of fins is each coupled to and extends away from the first cylinder for stirring paint in the paint container. A second cylinder is coupled to each of the fins such that the second cylinder is spaced from the first cylinder. In this way the second cylinder can be inserted into the paint container or be inserted into the open end of the paint roller.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a right side view of an embodiment of the disclosure.

FIG. 3 is a front view of an embodiment of the disclosure.

FIG. 4 is a back view of an embodiment of the disclosure.

DETAILED DESCRIPTION OF THE INVENTION

Figure 1:
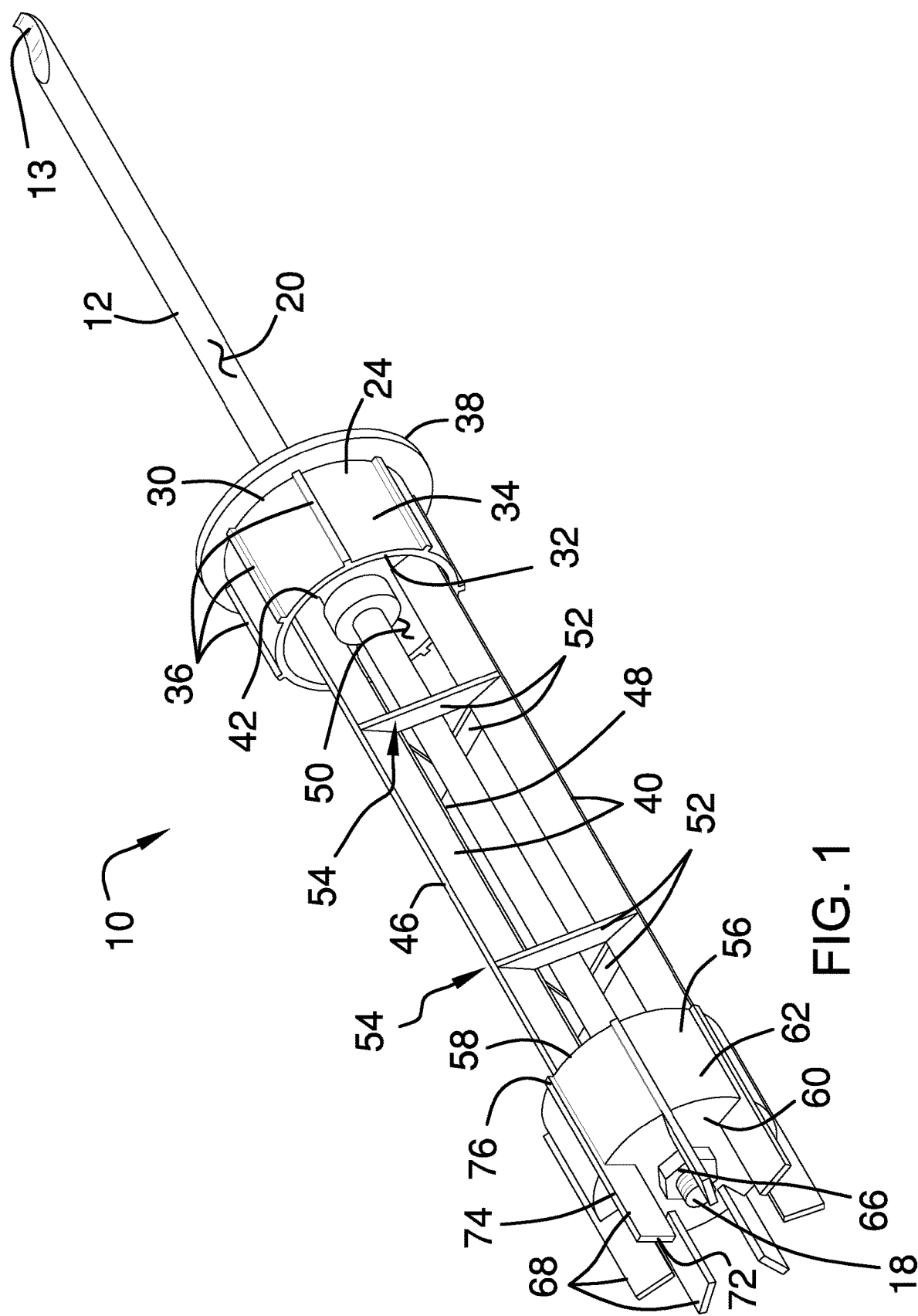
FIG. 1 is a perspective view of a paint multi-tool assembly according to an embodiment of the disclosure.
Figure 6:
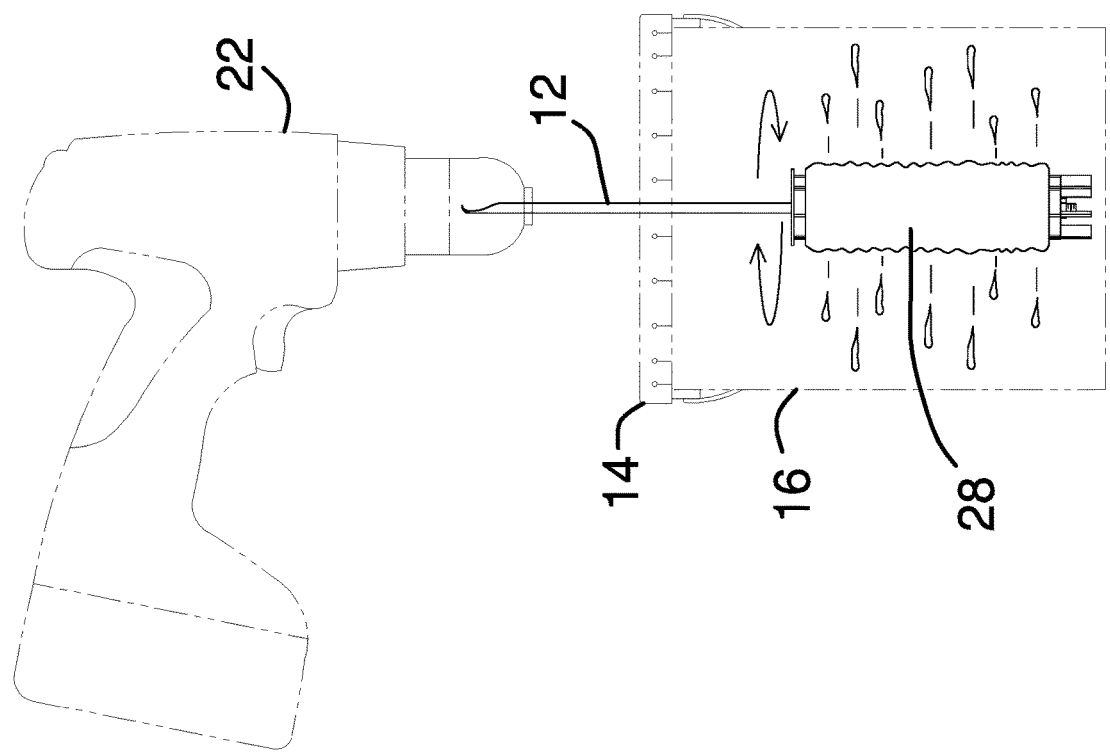
FIG. 6 is a perspective in-use view of an embodiment of the disclosure showing a paint roller being cleaned.
Figure 5:
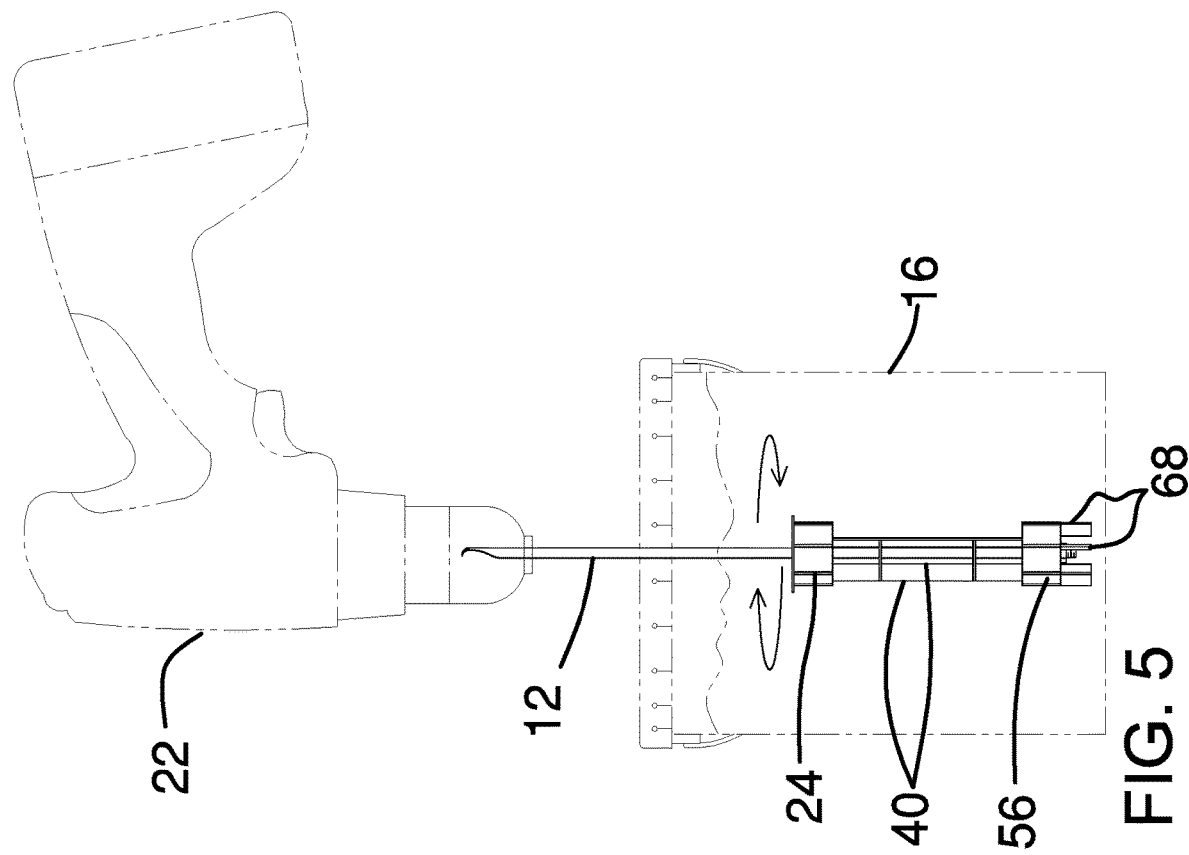
FIG. 5 is a perspective in-use view of an embodiment of the disclosure showing paint in a paint container being stirred.

With reference now to the drawings, and in particular to FIGS. 1 through 6 thereof, a new multi-tool device embodying the principles and concepts of an embodiment of the disclosure and generally designated by the reference numeral 10 will be described.

As best illustrated in FIGS. 1 through 6, the paint multi-tool assembly 10 generally comprises a shaft 12 that has a hooked end 13 to engage a lid 14 on a paint container 16 for opening the lid 14. The shaft 12 has a distal end 18 with respect to the hooked end 13 and an outer surface 20 extending therebetween. The outer surface 20 tapers to a point at the hooked end 13 and the point is curved away from a longitudinal axis of the shaft 12 to define the hooked end 13. The hooked end 13 is insertable into a power tool 22, such as an electric drill, thereby facilitating the shaft 12 to be rotated about the longitudinal axis when the power tool 22 is turned on. Additionally, the outer surface 20 of the shaft 12 is threaded adjacent to the distal end 18 of the shaft 12. The shaft 12 may have a length of at least 19.0 inches.

A first cylinder 24 is provided and the first cylinder 24 has an opening 26 therein for insertably receiving the shaft 12. In this way the first cylinder 24 can be inserted into an open end of a paint roller 28 thereby facilitating the paint roller 28 to be rotated for cleaning paint off of the paint roller 28. The first cylinder 24 has a first end 30, a second end 32 and an outer wall 34 extending therebetween. The second end 32 is open, the opening 26 extends through the first end 30 and the opening 26 is centrally positioned on the first end 30. The first cylinder 24 may have a length of at least 2.0 inches.

The outer wall 34 has a plurality of ridges 36 each extending outwardly from the outer wall 34. Each of the ridges 36 frictionally engages an interior surface of the paint roller 28 when the first cylinder 24 is inserted into the paint roller 28. In this way the paint roller 28 is retained on the first cylinder 24. Each of the ridges 36 extends between the first 30 and second 32 ends and the ridges 36 are spaced apart from each other and are distributed around the outer wall 34. A stop 38 is coupled to the first end 30 of the first cylinder 24 and the stop 38 extends outwardly beyond the outer wall 34 of the first cylinder 24. In this way the first stop 38 inhibits the paint roller 28 from passing beyond the first cylinder 24.

A plurality of fins 40 is each coupled to and extends away from the first cylinder 24 and each of the fins 40 is can be inserted into a paint container 16. The paint container 16 may be 5.0 gallon paint bucket, a 1.0 gallon paint can or a 1.0 quart paint can. Each of the fins 40 is rotated about the shaft 12 when the shaft 12 is inserted into the power tool 22. In this way each of the fins 40 stirs paint in the paint container 16 when the fins 40 are inserted into the paint container 16.

Each of the fins 40 has a primary end 42, a secondary end 44, a top edge 46 and a bottom edge 48. Each of the fins 40 is elongated between the primary 42 and secondary 44 ends. The top edge 46 of each of the fins 40 is coupled to an inside surface 50 of the outer wall 34 of the first cylinder 24 having the primary end 42 of each of the fins 40 being positioned inside the first cylinder 24. The fins 40 are spaced apart from each other and are distributed around the outer wall 34 of the first cylinder 24. In this way each of the fins 40 defines a respective point of a triangle. Each of the fins 40 may have a length of at least 8.0 inches.

A plurality of supports 52 is each coupled between a respective pair of the fins 40. The supports 52 inhibit the respective fins 40 from deflecting from the respective points of the triangle when the fins 40 are rotated. In this way the supports 52 enhance the fins 40 ability to stir the paint in the paint container 16. The supports 52 are arranged into a pair of groups of the supports 54. The groups of the supports 54 are spaced apart from each other and are distributed along the fins 40.

A second cylinder 56 is coupled to each of the fins 40 such that the second cylinder 56 is spaced from the first cylinder 24. Thus, the second cylinder 56 can be inserted into the paint container 16 or be inserted into the open end of the paint roller 28. The second cylinder 56 has a first end 58, a second end 60 and an outer wall 62 extending therebetween. Each of the first 24 and second 56 cylinders has an outer diameter sufficient to fit inside of a paint roller 28 of any conventional design. The second cylinder 56 may have a length of at least 2.0 inches. In this way the first cylinder 24, the fins 40 and the second cylinder 56 can accommodate a 12.0 inch paint roller 28, a 9.0 inch paint roller 28 or a 3.0 inch paint roller 28.

The first end 58 of the second cylinder 56 is open and the top edge 46 of each of the fins 40 is attached to an inside surface 64 of the outer wall 62 of the second cylinder 56. The first end 58 of the second cylinder 56 is directed toward the second end 32 of the first cylinder 24. The second end 60 of the second cylinder 56 has an aperture 66 extending therethrough. The distal end 18 of the shaft 12 extends through the aperture 66 when the shaft 12 is extended through the opening 26 in the first cylinder 24. Moreover, the threads on the shaft 12 are exposed with respect to the second cylinder 56.

A plurality of vanes 68 is each embedded into the second cylinder 56. Each of the vanes 68 engages a bottom of the paint container 16 when the second cylinder 56 is positioned in the paint container 16. In this way the vanes 68 agitate paint on a bottom of the paint container 16 thereby facilitating the paint in the paint container 16 to be thoroughly mixed. Each of the vanes 68 has a primary end 70, a secondary end 72 and an outer edge 74 extending therebetween.

Each of the vanes 68 is embedded into the outer wall 34 of the second cylinder 56 having the primary end 70 of each of the vanes 68 being aligned with the first end 58 of the second cylinder 56. Moreover, the secondary end 72 of each of the vanes 68 is spaced from the second end 60 of the second cylinder 56. In this way the secondary end 72 of each of the vanes 68 can engage the bottom of the paint container 16 when the second cylinder 56 is inserted into the paint container 16. The outer edge 74 of each of the vanes 68 protrudes from the outer wall 62 of the second cylinder 56. In this way the outer edge 74 of each of the vanes 68 can frictionally engage the interior surface of the paint roller 28 when each of the first 24 and second 56 cylinders is inserted into the paint roller 28.

A nut 76 is provided and the nut 76 threadably engages the distal end 18 of the shaft 12 when the shaft 12 is extended through the aperture 66 in the second cylinder 56. In this way the nut 76 inhibits the second cylinder 56 from passing beyond the distal end 18 of the shaft 12. The shaft 12, the first cylinder 24, the fins 40 and the second cylinder 56 may have a combined length of at least 19.0 inches when the shaft 12 is extended through each of the first 24 and second 56 cylinders.

In use, the hooked end 13 of the shaft 12 can be employed to pry open the lid 14 on the paint container 16. The distal end 18 of the shaft 12 is extended through the opening 26 in the first cylinder 24 and the aperture 66 in the second cylinder 56. Additionally, the nut 76 is threaded onto the shaft 12 to retain the first 24 and second 56 cylinders on the shaft 12. The hooked end 13 of the shaft 12 is inserted into the power tool 22 for rotating the shaft 12 when the power tool 22 is turned on. The paint roller 28 is slid over each of the first 24 and second 56 cylinders when the paint roller 28 needs to be cleaned. Thus, the paint roller 28 is rotated when the power tool 22 is turned on, thereby removing paint from the paint roller 28 via centrifugal force. Each of the first cylinder 24, the fins 40 and the second cylinder 56 are inserted into the paint container 16 and the power tool 22 is turned on. In this way the fins 40 and the vanes 68 agitate the paint in the paint container 16 for mixing the paint.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A paint multi-tool assembly being configured to stir paint in a paint can and clean a paint roller, said assembly comprising:
    a shaft having a hooked end wherein said hooked end is configured to engage a lid on a paint can for opening the lid, said hooked end being insertable into a power tool thereby facilitating said shaft to be rotated when the power tool is turned on;

a first cylinder having an opening therein for insertably receiving said shaft wherein said first cylinder is configured to be inserted into an open end of a paint roller thereby facilitating the paint roller to be rotated for cleaning paint off of the paint roller;

a plurality of fins, each of said fins being coupled to and extending away from said first cylinder wherein each of said fins is configured to be inserted into a paint container, each of said fins being rotated about said shaft when said shaft is inserted into the power tool wherein each of said fins is configured to stir paint in the paint container when said fins are inserted into the paint container;

a second cylinder being coupled to each of said fins such that said second cylinder is spaced from said first cylinder wherein said second cylinder is configured to be inserted into the paint container or be inserted into the open end of the paint roller; and a plurality of vanes, each of said vanes being embedded into said second cylinder wherein each of said vanes is configured to engage a bottom of the paint container when said second cylinder is positioned in the paint container thereby facilitating said vanes to agitate paint on a bottom of the paint container.

2. The assembly according to claim 1, wherein said shaft has a distal end with respect to said hooked end and an outer surface extending therebetween, said outer surface tapering to a point at said hooked end, said point being curved away from a longitudinal axis of said shaft to define said hooked end, said outer surface of said shaft being threaded adjacent to said distal end of said shaft.

3. The assembly according to claim 2, wherein:

said first cylinder has a first end, a second end and an outer wall extending therebetween, said second end being open, said opening extending through said first end, said opening being centrally positioned on said first end; and said outer wall has a plurality of ridges each extending outwardly from said outer wall wherein each of said ridges is configured to frictionally engage an interior surface of the paint roller when said first cylinder is inserted into the paint roller for retaining the paint roller on said first cylinder, each of said ridges extending between said first and second ends, said ridges being spaced apart from each other and being distributed around said outer wall.

4. The assembly according to claim 3, wherein each of said fins has a primary end, a secondary end, a top edge and a bottom edge, each of said fins being elongated between said primary and secondary ends, said top edge of each of said fins being coupled to an inside surface of said outer wall of said first cylinder having said primary end of each of said fins being positioned inside said first cylinder, said fins being spaced apart from each other and being distributed around said outer wall of said first cylinder such that each of said fins defines a respective point of a triangle.

5. The assembly according to claim 4, further comprising a plurality of supports, each of said supports being coupled between a respective pair of said fins to inhibit said respective fins from deflecting from said respective points of said triangle when said fins are rotated wherein said supports are configured to enhance said fins ability to stir the paint in the paint container, said supports being arranged into a pair of groups of said supports, said pair of groups of said supports being spaced apart from each other and being distributed along said fins.

6. The assembly according to claim 4, wherein said second cylinder has a first end, a second end and an outer wall extending therebetween, said first end of said second cylinder being open, said top edge of each of said fins being attached to an inside surface of said outer wall of said second cylinder having said first end of said second cylinder being directed toward said second end of said first cylinder.

7. The assembly according to claim 6, wherein said second end of said second cylinder has an aperture extending therethrough, said distal end of said shaft extending through said aperture when said shaft is extended through said opening in said first cylinder having said threads on said shaft being exposed with respect to said second cylinder.

8. The assembly according to claim 7, wherein each of said vanes has a primary end, a secondary end and an outer edge extending therebetween, each of said vanes being embedded into said outer wall of said second cylinder having said primary end of each of said vanes being aligned with said first end of said second cylinder and having said secondary end of each of said vanes being spaced from said second end of said second cylinder wherein said secondary end of each of said vanes is configured to engage the bottom of the paint container when said second cylinder is inserted into the paint container.

9. The assembly according to claim 8, wherein said outer edge of each of said vanes protrudes from said outer wall of said second cylinder wherein said outer edge of each of said vanes is configured to frictionally engage the interior surface of the paint roller when each of said first and second cylinders is inserted into the paint roller.

10. The assembly according to claim 9, further comprising a nut threadably engaging said distal end of said shaft when said shaft is extended through said aperture in said second cylinder thereby inhibiting said second cylinder from passing beyond said distal end of said shaft.

11. A paint multi-tool assembly being configured to stir paint in a paint can and clean a paint roller, said assembly comprising:

a shaft having a hooked end wherein said hooked end is configured to engage a lid on a paint can for opening the lid, said shaft having a distal end with respect to said hooked end and an outer surface extending therebetween, said outer surface tapering to a point at said hooked end, said point being curved away from a longitudinal axis of said shaft to define said hooked end, said hooked end being insertable into a power tool thereby facilitating said shaft to be rotated about said longitudinal axis when the power tool is turned on, said outer surface of said shaft being threaded adjacent to said distal end of said shaft;

a first cylinder having an opening therein for insertably receiving said shaft wherein said first cylinder is configured to be inserted into an open end of a paint roller thereby facilitating the paint roller to be rotated for cleaning paint off of the paint roller, said first cylinder having a first end, a second end and an outer wall extending therebetween, said second end being open, said opening extending through said first end, said opening being centrally positioned on said first end, said outer wall having a plurality of ridges each extending outwardly from said outer wall wherein each of said ridges is configured to frictionally engage an interior surface of the paint roller when said first cylinder is inserted into the paint roller for retaining the paint roller on said first cylinder, each of said ridges extending between said first and second ends, said ridges being spaced apart from each other and being distributed around said outer wall;
a stop being coupled to said first end of said first cylinder wherein said first stop is configured to inhibit the paint roller from passing beyond said first cylinder;
a plurality of fins, each of said fins being coupled to and extending away from said first cylinder wherein each of said fins is configured to be inserted into a paint container, each of said fins being rotated about said shaft when said shaft is inserted into the power tool wherein each of said fins is configured to stir paint in the paint container when said fins are inserted into the paint container, each of said fins having a primary end, a secondary end, a top edge and a bottom edge, each of said fins being elongated between said primary and secondary ends, said top edge of each of said fins being coupled to an inside surface of said outer wall of said first cylinder having said primary end of each of said fins being positioned inside said first cylinder, said fins being spaced apart from each other and being distributed around said outer wall of said first cylinder such that each of said fins defines a respective point of a triangle;
a plurality of supports, each of said supports being coupled between a respective pair of said fins to inhibit said respective fins from deflecting from said respective points of said triangle when said fins are rotated wherein said supports are configured to enhance said fins ability to stir the paint in the paint container, said supports being arranged into a pair of groups of said supports, said pair of groups of said supports being spaced apart from each other and being distributed along said fins;
a second cylinder being coupled to each of said fins such that said second cylinder is spaced from said first cylinder wherein said second cylinder is configured to be inserted into the paint container or be inserted into the open end of the paint roller, said second cylinder having a first end, a second end and an outer wall extending therebetween, said first end of said second cylinder being open, said top edge of each of said fins being attached to an inside surface of said outer wall of said second cylinder having said first end of said second cylinder being directed toward said second end of said first cylinder, said second end of said second cylinder having an aperture extending therethrough, said distal end of said shaft extending through said aperture when said shaft is extended through said opening in said first cylinder having said threads on said shaft being exposed with respect to said second cylinder;
a plurality of vanes, each of said vanes being embedded into said second cylinder wherein each of said vanes is configured to engage a bottom of the paint container when said second cylinder is positioned in the paint container thereby facilitating said vanes to agitate paint on a bottom of the paint container, each of said vanes having a primary end, a secondary end and an outer edge extending therebetween, each of said vanes being embedded into said outer wall of said second cylinder having said primary end of each of said vanes being aligned with said first end of said second cylinder and having said secondary end of each of said vanes being spaced from said second end of said second cylinder wherein said secondary end of each of said vanes is configured to engage the bottom of the paint container when said second cylinder is inserted into the paint container, said outer edge of each of said vanes protruding from said outer wall of said second cylinder wherein said outer edge of each of said vanes is configured to frictionally engage the interior surface of the paint roller when each of said first and second cylinders is inserted into the paint roller; and
a nut threadably engaging said distal end of said shaft when said shaft is extended through said aperture in said second cylinder thereby inhibiting said second cylinder from passing beyond said distal end of said shaft.

* * * * *